US012323765B2

(12) United States Patent
Johnson

(10) Patent No.: US 12,323,765 B2
(45) Date of Patent: Jun. 3, 2025

(54) GENERATING AN AUDIO SIGNAL FROM MULTIPLE INPUTS

(71) Applicant: Starkey Laboratories, Inc., Eden Prairie, MN (US)

(72) Inventor: Andrew Joseph Johnson, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 427 days.

(21) Appl. No.: 17/755,248

(22) PCT Filed: Oct. 30, 2020

(86) PCT No.: PCT/US2020/070729
§ 371 (c)(1),
(2) Date: Apr. 25, 2022

(87) PCT Pub. No.: WO2021/087524
PCT Pub. Date: May 6, 2021

(65) Prior Publication Data

US 2022/0408200 A1 Dec. 22, 2022

Related U.S. Application Data

(60) Provisional application No. 62/927,961, filed on Oct. 30, 2019.

(51) Int. Cl.
*H04R 25/00* (2006.01)

(52) U.S. Cl.
CPC ........... *H04R 25/43* (2013.01); *H04R 25/505* (2013.01); *H04R 25/554* (2013.01); (Continued)

(58) Field of Classification Search
None
See application file for complete search history.

(56) References Cited

U.S. PATENT DOCUMENTS 4,187,413 A 2/1980 Moser
5,581,620 A 12/1996 Brandstein et al.
(Continued)

FOREIGN PATENT DOCUMENTS

EP 2928213 A1 10/2015
WO WO-2021087524 A1 5/2021

OTHER PUBLICATIONS

"International Application Serial No. PCT/US2020/070729, International Search Report mailed Jan. 29, 2021", 5 pgs.
(Continued)

*Primary Examiner* — Paul W Huber
(74) *Attorney, Agent, or Firm* — Schwegman Lundberg & Woessner, P.A.

(57) ABSTRACT

A system, such as an ear-wearable device or a hearing aid, can receive multiple audio signals representing a same audio content, can cross-correlate the multiple audio signals to determine relative delays between the audio signals, can apply the determined delays to at least one of the audio signals to form multiple synchronized audio signals, and can mix at least two of the synchronized audio signals in time-varying proportions to form an output audio signal. The system can optionally adjust the mix proportions, in real time, to increase or optimize the signal-to-noise ratio of the output audio signal. The system can optionally perform the cross-correlation repeatedly, at regular or irregular time intervals, to update the relative delays. The system can optionally divide the audio signals into frequency bands, and apply these operations to each frequency band, independent of the other frequency bands.

18 Claims, 4 Drawing Sheets

(52) U.S. Cl.
CPC ......... *H04R 25/604* (2013.01); *H04R 25/609* (2019.05); *H04R 2225/51* (2013.01); *H04R 2430/01* (2013.01)

(56) References Cited

U.S. PATENT DOCUMENTS

| | | | | |
|---|---|---|---|---|
| 9,215,534 | B2 | 12/2015 | Sacha et al. | |
| 10,431,239 | B2 | 10/2019 | Jensen et al. | |
| 2016/0112811 | A1 | 4/2016 | Jensen et al. | |
| 2021/0368263 | A1* | 11/2021 | Vesa .................... | H04R 29/006 |

OTHER PUBLICATIONS

"International Application Serial No. PCT/US2020/070729, Written Opinion mailed Jan. 29, 2021", 8 pgs.

Smeds, Karolina, et al., "Estimation of Signal-to-Noise Ratios in Realistic Sound Scenarios", J Am Acad Audiol 26, (2015), 14 pgs.

"International Application Serial No. PCT US2020 070729, International Preliminary Report on Patentability mailed May 12, 2022", 10 pgs.

* cited by examiner

GENERATING AN AUDIO SIGNAL FROM MULTIPLE INPUTS

CROSS-REFERENCE TO RELATED APPLICATION

This application is a U.S. National Stage Filing under 35 U.S.C. 371 from International Application No. PCT/US2020/070729, filed on Oct. 30, 2020, and published as WO 2021/087524, which claims the benefit of U.S. Provisional Application No. 62/927,961, filed Oct. 30, 2019, each of which are hereby incorporated by reference in their entirety.

FIELD OF THE DISCLOSURE

The present disclosure relates generally to improving signal quality in an audio system that can use multiple sources for an audio signal.

BACKGROUND OF THE DISCLOSURE

There have been many advances in ear-wearable devices, including hearing aids. Early hearing aids included a microphone to convert sound waves (e.g. time-varying pressure that represents an audio signal) to an electrical signal, an amplifier to process the electrical signal, and a receiver to present the processed signal to a listener's ear. Recent advances in hearing aids can additionally allow a listener to switch from the microphone to alternate sources for the audio signal.

For example, some modern hearing aids can allow the listener to switch between the microphone and a signal received by a telecoil. A telecoil can include a loop of electrically conductive wire positioned in the hearing aid and configured to receive signals from external wire loops via a magnetic field (e.g., via Faraday's law of induction). So-called loop systems can provide audio content in these external wire loops. A loop system can include a wire loop that encircles a particular area, such as a seating area of a theater, or a back seat of a taxicab.

As another example, some modern hearing aids can include an antenna that can receive audio content through a specified wireless digital protocol. For example, a modern hearing aid can couple to a wireless stream of an audio source via Bluetooth connectivity.

Some modern hearing aids can switch automatically between audio sources, based on events. For example, if a magnetic switch in the hearing aid detects a magnetic field produced by a telephone handset, then the hearing aid can automatically switch to the telecoil. As another example, if a radio in the hearing aid detects a presence of a wireless stream via an antenna in the hearing aid, the hearing aid can automatically switch to the wireless stream.

One drawback to such automatic switching is that it may not improve a quality of the processed signal sent to the listener's ear. For example, in a case where a microphone signal may be relatively clean, but a corresponding Bluetooth signal may be relatively noisy, such automatic switching may result in the relatively noisy signal being processed and directed to the listener's ear.

There is ongoing effort to improve the quality of the processed signal sent to the listener's ear.

SUMMARY

In an example, a system for generating an audio signal from multiple inputs can include: at least one processor and memory coupled to the at least one processor. The memory can store instructions that, when executed by the at least one processor, cause the at least one processor to execute operations. The operations can include: receiving a first audio signal and a second audio signal that both represent a same audio content; cross-correlating the first and second audio signals to determine a relative delay between the first and second audio signals; applying the determined delay to at least one of the first or second audio signals to form a first synchronized audio signal representing the first audio signal and form a second synchronized audio signal representing the second audio signal, the first synchronized audio signal being synchronized with the second synchronized audio signal; and mixing the first and second synchronized audio signals in time-varying proportions to form an output audio signal that represents the audio content.

In an example, a method for generating an audio signal from multiple inputs can include: receiving a first audio signal and a second audio signal that both represent a same audio content; cross-correlating the first and second audio signals to determine a relative delay between the first and second audio signals; applying the determined delay to at least one of the first or second audio signals to form a first synchronized audio signal representing the first audio signal and form a second synchronized audio signal representing the second audio signal, the first synchronized audio signal being synchronized with the second synchronized audio signal; and mixing the first and second synchronized audio signals in time-varying proportions to form an output audio signal that represents the audio content.

In an example, an ear-wearable device can include: a housing; at least one processor disposed in the housing; a microphone coupled to the at least one processor and configured to convert sound waves proximate the housing to a microphone audio signal that represents an audio content; a telecoil coupled to the at least one processor and configured to convert a modulated electromagnetic field proximate the housing to a telecoil audio signal that represents the audio content; an antenna coupled to the at least one processor and configured to convert a wireless signal proximate the housing to a wireless audio signal that represents the audio content; and memory coupled to the at least one processor. The memory can store instructions that, when executed by the at least one processor, cause the at least one processor to execute operations. The operations can include: receiving the microphone audio signal, the telecoil audio signal, and the wireless audio signal; cross-correlating the microphone audio signal, the telecoil audio signal, and the wireless audio signal to determine relative delays among the microphone audio signal, the telecoil audio signal, and the wireless audio signal; applying the determined delays to at least some of the microphone audio signal, the telecoil audio signal, or the wireless audio signal to form a synchronized microphone audio signal representing the microphone audio signal, form a synchronized telecoil audio signal representing the telecoil audio signal, and form a synchronized wireless audio signal representing the wireless audio signal, the synchronized microphone audio signal, the synchronized telecoil audio signal, and the synchronized wireless audio signal being synchronized to one another; and mixing at least two of the synchronized microphone audio signal, the synchronized telecoil audio signal, or the synchronized wireless audio signal in time-varying proportions to form an output audio signal that represents the audio content. The hearing aid can include a speaker disposed in the housing and configured to produce audio corresponding to the output audio signal.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

The systems and methods discussed herein have multiple applications, including use in ear-wearable devices (e.g., a hearing aid, headphones, etc.). Although the use in ear-wearable devices such as a hearing aid is discussed in detail herein, it will be understood that the systems and methods discussed herein can also apply beyond ear-wearable devices to other devices such as sound mixing boards at concert venues, and other suitable applications.

When used in a hearing aid of a listener, the systems and methods discussed herein can apply to many different situations. As a first example, the systems and methods discussed herein can apply to a listener positioned in a room with a loop system, with a telecoil in the hearing aid, and with an acoustic signal of interest in the room. As a second example, the systems and methods discussed herein can apply to a listener streaming audio to the hearing aid from a television, telephone, remote microphone, or other device, additionally with an acoustic signal of interest in the room. As a third example, the systems and methods discussed herein can apply to a listener having an acoustic signal of interest in the room, and additionally having a companion microphone that also picks up the acoustic signal in the room. As a fourth example, the systems and methods discussed herein can apply to a listener having an accelerometer and/or a vibration sensor in the hearing aid, where the listener wants to attenuate the sound of his or her own voice (thereby reducing an occlusion effect) or enhance his or her own voice (such as, on a phone call). As a fifth example, the systems and methods discussed herein can apply to a listener participating in a phone call in microphone mode or telecoil mode without realizing there is a good signal on another transducer. In all of these five examples, the systems and method discussed herein can increase or maximize a signal-to-noise ratio of the output audio signal, which can improve the sound for the listener.

Figure 1:
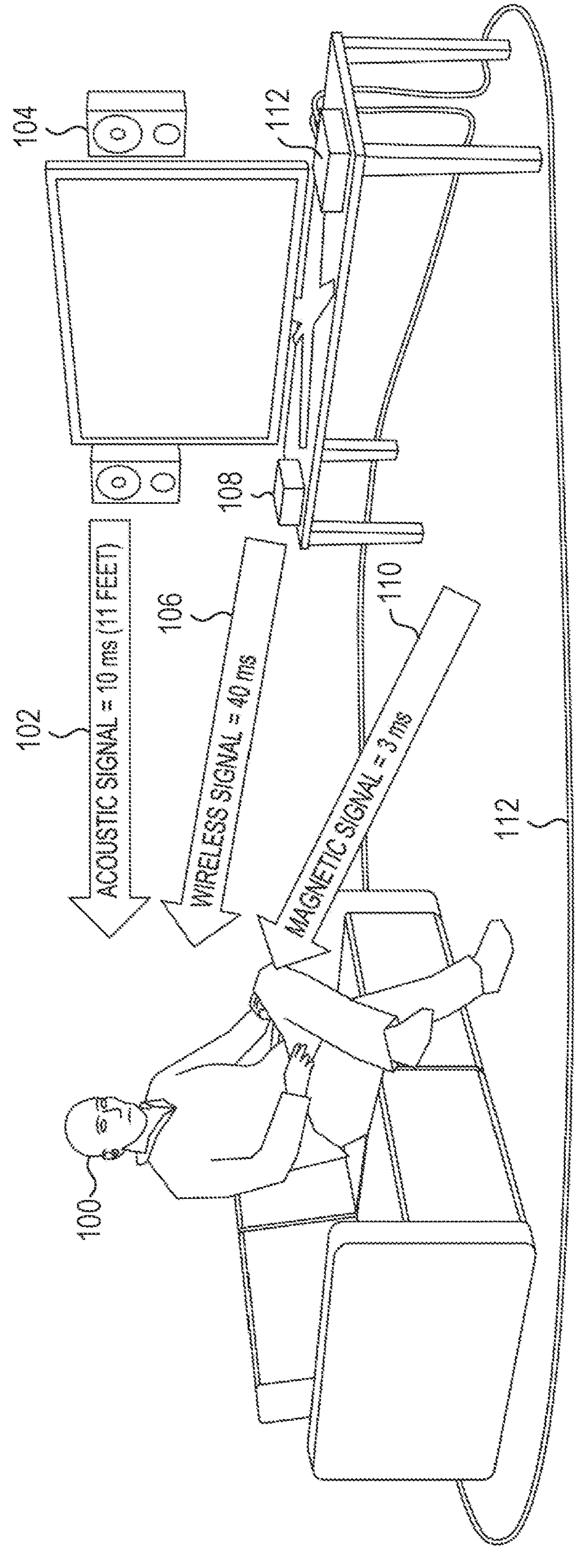
FIG. 1 shows an example of a system for generating an audio signal from multiple inputs, in accordance with some examples.

FIG. 1 shows an example of a system 100 for generating an audio signal from multiple inputs, in accordance with some examples. In the example of FIG. 1, the system 100 is configured a hearing aid. It will be understood that other configurations are also possible, such as for an audio mixer or mixing board that can combine signals from multiple microphones.

The system 100 can receive multiple audio signals representing a same audio content. In this example, the audio content is the audio from a television program. In this example, the audio signals are an acoustic signal 102 originating from a loudspeaker 104, a wireless signal 106 originating from an audio streamer 108, and a magnetic signal 110 originating from a room loop system 112. In this example, the acoustic signal 102 is delayed by 10 milliseconds, due to the acoustic sound waves propagating 3.4 meters (11 feet) in air at the speed of sound (343 meters per second) from the loudspeaker 104 to the listener. In this example, the wireless signal 106 is delayed by a relatively large 40 milliseconds, due to the time required to process data packets at the audio streamer 108. In this example, the magnetic signal 110 is delayed by a relatively small 3 milliseconds, due to the relatively fast analog processing in the room loop system 112.

The system 100 can cross-correlate the multiple audio signals to determine relative delays between the audio signals, can apply the determined delays to at least one of the audio signals to form multiple synchronized audio signals, and can mix at least two of the synchronized audio signals in time-varying proportions to form an output audio signal. Synchronizing the audio signals in this manner can allow the system 100 to switch among the audio signals and/or combine the audio signals as needed. This can help avoid artifacts that might arise from switching between audio signals that are out of synchronization, such as glitches or small pauses. This can also help avoid artifacts that might arise from combining audio signals that are out of synchronization, such as having a tinny tonal quality, smearing of audio, or a ringing or delay.

The system 100 can optionally adjust the mix proportions, in real time, to increase or maximize a signal-to-noise ratio of the output audio signal, which can raise or optimize the signal-to-noise ratio of the output audio signal. The system 100 can optionally perform the cross-correlation repeatedly, at regular or irregular time intervals, to update the relative delays. The system 100 can optionally divide the audio signals into frequency bands, and apply these operations to each frequency band, independent of the other frequency bands.

Figure 2:
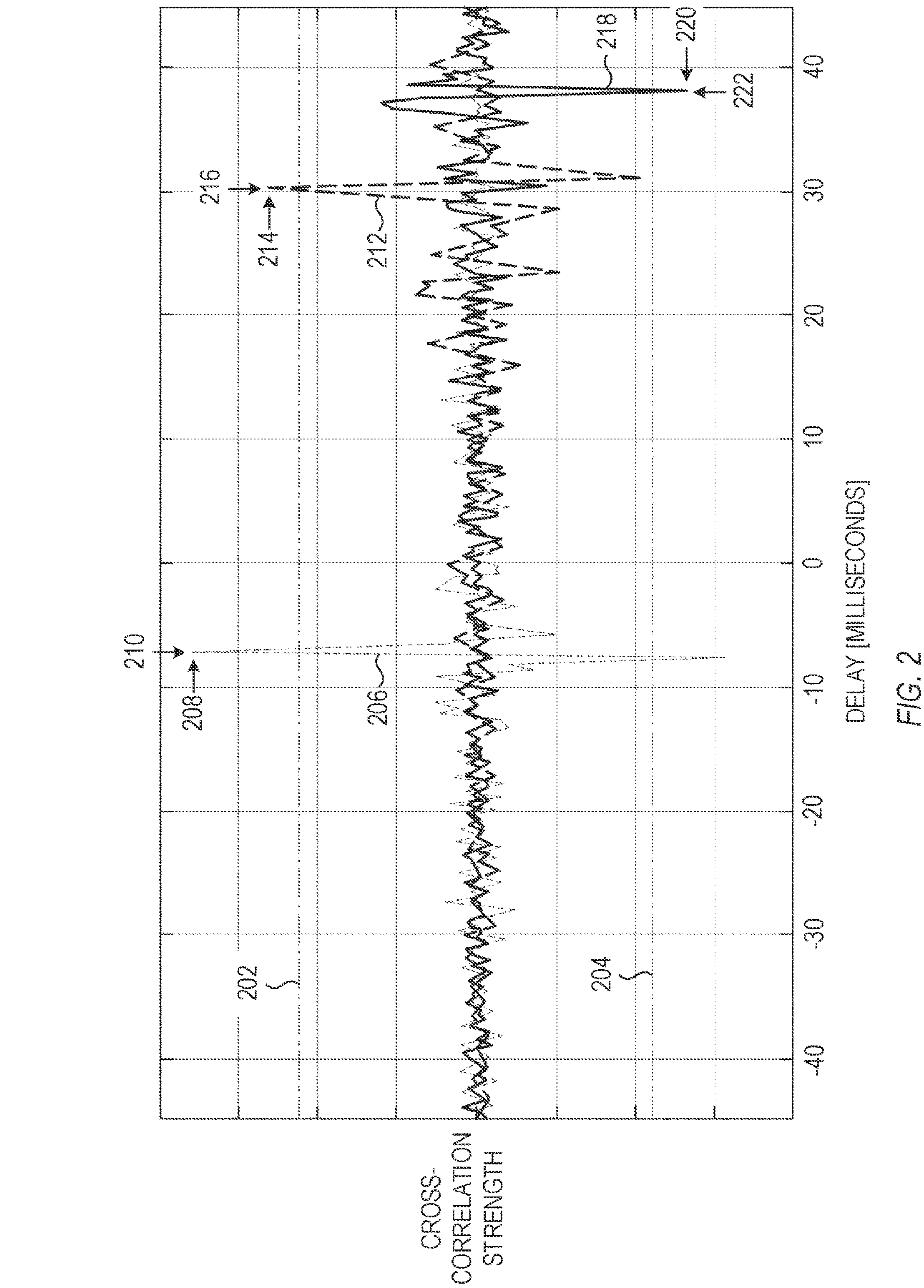
FIG. 2 shows an example of cross-correlation data from the system of FIG. 1, in accordance with some examples.

FIG. 2 shows an example of cross-correlation data from the system 100 of FIG. 1, in accordance with some examples. In FIG. 2, the horizontal axis corresponds to time or delay, and the vertical axis corresponds to (dimensionless) correlation value.

Element 202 is a specified positive correlation threshold value. Element 204 is a specified negative correlation threshold value. If a positive peak in a cross-correlation data set (curve) exceeds the positive correlation threshold value 202, or a negative peak is lower than the negative correlation threshold value 204, the system 100 deems the two correlated audio signals to be suitably correlated, and therefore deems that the two correlated audio signals correspond to the same audio content.

FIG. 2 shows three cross-correlation data sets, or curves, which correspond to the number of ways the three audio signals of FIG. 1 can be combined pairwise.

A first curve 206 (dotted) shows the cross-correlation between the acoustic signal 102 ("mic") and the magnetic signal 110 ("coil"). The first curve 206 has a positive peak value 208 that exceeds the positive correlation threshold value 202. If there are both negative and positive peaks, the peak having the highest absolute value is used. The location 210 of the peak value 208 represents the delay between the acoustic signal 102 ("mic") and the magnetic signal 110 ("coil"). In this example, the acoustic signal 102 lags the magnetic signal 110 by 7 milliseconds.

A second curve 212 (dashed) shows the cross-correlation between the acoustic signal 102 ("mic") and the wireless signal 106 ("stream"). The second curve 212 has a positive peak value 214 that exceeds the positive correlation threshold value 202. The location 216 of the peak value 214 represents the delay between the acoustic signal 102 ("mic") and the wireless signal 106 ("stream"). In this example, the acoustic signal 102 leads the wireless signal 106 by 30 milliseconds.

A third curve 218 (solid) shows the cross-correlation between the magnetic signal 110 ("coil") and the wireless signal 106 ("stream"). The second curve 218 has a negative peak value 220 that is less than the negative correlation threshold value 204. Because the peak value 220 is negative, the magnetic signal 110 or the wireless signal 106 and the system 100 are out of phase with each other. To correct the phase, the system 100 can reverse the polarity of the magnetic signal 110 or the wireless signal 106, so that when the magnetic signal 110 or the wireless signal 106 are summed, they add, rather than cancel. The location 222 of the peak value 220 represents the delay between the magnetic signal 110 ("coil") and the wireless signal 106 ("stream"). In this example, the magnetic signal 110 leads the wireless signal 106 by 37 milliseconds.

In this example, the delay values of 7 milliseconds, 30 milliseconds, and 37 milliseconds can be below a specified delay threshold value, such as 50 milliseconds. In some examples, the system 100 can check to ensure that the delay values are less than the specified delay threshold value to continue the processing.

Figure 3:
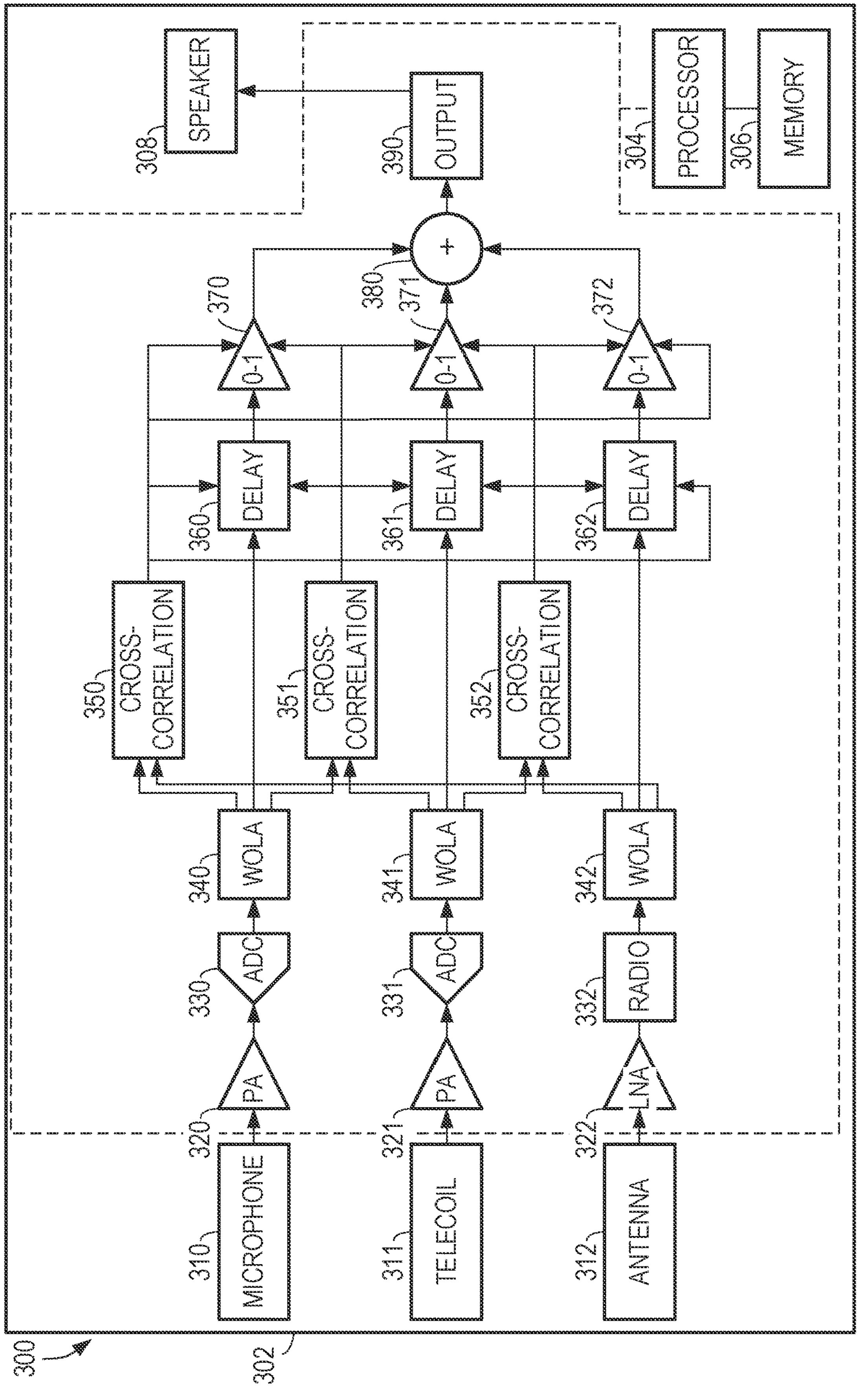
FIG. 3 shows a schematic diagram of an example of a system for generating an audio signal from multiple inputs, in accordance with some examples.

FIG. 3 shows a schematic diagram of an example of a system 300 for generating an audio signal from multiple inputs, in accordance with some examples. The system 300, as shown in the example of FIG. 3 is configured as a hearing aid. It will be understood that other configurations are also possible, such as for an audio mixer or mixing board that can combine signals from multiple microphones. In some examples, the system 300 can receive multiple audio signals representing a same audio content, can cross-correlate the multiple audio signals to determine relative delays between the audio signals, can apply the determined delays to at least one of the audio signals to form multiple synchronized audio signals, and can mix at least two of the synchronized audio signals in time-varying proportions to form an output audio signal.

The system 300 can include a housing 302. In some examples, the housing 302 can be formed from plastic and/or metal. In some examples, the housing 302 can be shaped to fit within a listener's ear.

The system 300 can include at least one processor 304. For simplicity, the at least one processor 304 is subsequently referred to as a (single) processor 304. It will be understood that the (single) processor 304 can alternatively include multiple processors 304 that are in communication with one another. For example, the processor 304 can include a single processor 304 disposed in the housing 302, multiple processors 304 disposed in the housing 302, and/or one or more processors 304 disposed in the housing 302 and wirelessly communicating with one or more processors 304 disposed away from the housing 302.

A microphone 310 coupled to the processor 304 can convert sound waves proximate the housing 302 to a microphone audio signal that represents an audio content.

A telecoil 311 coupled to the processor 304 can convert a modulated electromagnetic field proximate the housing 302 to a telecoil audio signal that represents the audio content.

An antenna 312 coupled to the processor 304 can convert a wireless signal proximate the housing 302 to a wireless audio signal that represents the audio content.

Although not shown in FIG. 3, other suitable audio signal sources can be used, and can be implemented and connected in a manner similar to the configuration shown in FIG. 3. For example, a vibration sensor coupled to the processor can convert spoken sound waves proximate the vibration sensor to a vibration sensor audio signal that represents a spoken portion of the audio content. For example, the vibration sensor can pick up a listener's contribution to a telephone call (e.g., the portion of the telephone call audio that is spoken by the listener). Other suitable sources can also be used.

The microphone 310, the telecoil 311, and the antenna 312 can be sources for audio signals that represent a same audio content. For example, a movie theater can include speakers that produce audio that can be received by the microphone 310. The movie theater can also include a room loop around a perimeter of the seating area, which can direct audio to the telecoil 311 via Faraday's law of induction. The movie theater can also include a Bluetooth (or other wireless) transmitter, which can transmit a digital audio signal to the antenna 312. For this movie theater, the microphone 310, the telecoil 311, and the antenna 312 can receive respective audio signals that all represent the audio content in the theater. The system 300 can automatically select and/or combine the audio signals to from the microphone 310, the telecoil 311, and the antenna 312 to automatically increase or maximize a signal-to-noise ratio for the listener.

The system 300 can include memory 306 coupled to the processor 304. The memory 306 can store instructions that, when executed by the processor 304, cause the processor 304 to execute operations. The operations are discussed below, and include details regarding how the processor 304 can receive multiple audio signals representing a same audio content, can cross-correlate the multiple audio signals to determine relative delays between the audio signals, can apply the determined delays to at least one of the audio signals to form multiple synchronized audio signals, and can mix at least two of the synchronized audio signals in time-varying proportions to form an output audio signal. A speaker 308 disposed in the housing 302 can produce audio corresponding to the output audio signal. For configurations in which the system 300 is a hearing aid, the housing 302 can position the speaker 308 in a suitable location in a listener's ear.

In some examples, the operations can include: receiving a first audio signal and a second audio signal that both represent a same audio content; cross-correlating the first and second audio signals to determine a relative delay between the first and second audio signals; applying the determined delay to at least one of the first or second audio signals to form a first synchronized audio signal representing the first audio signal and form a second synchronized audio signal representing the second audio signal, the first synchronized audio signal being synchronized with the second synchronized audio signal; and mixing the first and second synchronized audio signals in time-varying proportions to form an output audio signal that represents the audio content. The system 300 can include circuitry to perform these operations. The circuitry can include hardware, software (such as executed by the processor 304), or a combination of hardware and software. FIG. 3 includes a dashed outline to indicate which elements of FIG. 3 can optionally be included in software and executed by the processor 304. Any or all of these elements can optionally be included in software.

The microphone 310 can convert sound waves proximate the housing 302 to an analog microphone audio signal. A microphone preamplifier 320 can boost the microphone audio signal to form an analog boosted microphone audio signal. A microphone analog-to-digital converter 330 can convert the boosted microphone audio signal to a digital microphone audio signal. An optional microphone weighted overlap add (WOLA) module 340 can separate the digital microphone audio signal into two or more specified frequency bands, such that downstream processing can be performed for each frequency band, independent of the other frequency bands. At the end of the processing, the frequency band-separated signals can be combined to form a full-frequency audio signal. For simplicity, we continue to refer to a digital microphone audio signal, with the understanding that subsequent processing can be performed on individual frequency bands of the digital microphone audio signal.

The telecoil 311 can convert a modulated electromagnetic field proximate the housing 302 to an analog telecoil audio signal. A telecoil preamplifier 321 can boost the telecoil audio signal to form an analog boosted telecoil audio signal. A telecoil analog-to-digital converter 331 can convert the boosted telecoil audio signal to a digital telecoil audio signal. An optional telecoil weighted overlap add (WOLA) module 341 can separate the digital telecoil audio signal into two or more specified frequency bands, such that downstream processing can be performed for each frequency band, independent of the other frequency bands. At the end of the processing, the frequency band-separated signals can be combined to form a full-frequency audio signal. For simplicity, we continue to refer to a digital telecoil audio signal, with the understanding that subsequent processing can be performed on individual frequency bands of the digital telecoil audio signal.

The antenna 312 can convert a wireless signal proximate the housing 302 to an antenna signal. An antenna low-noise amplifier 322 can boost the antenna signal to form a boosted antenna signal. A suitable radio receiver 332 can convert the boosted antenna signal to a digital wireless audio signal. An optional antenna weighted overlap add (WOLA) module 342 can separate the digital wireless audio signal into two or more specified frequency bands, such that downstream processing can be performed for each frequency band, independent of the other frequency bands. At the end of the processing, the frequency band-separated signals can be combined to form a full-frequency audio signal. For simplicity, we continue to refer to a digital wireless audio signal, with the understanding that subsequent processing can be performed on individual frequency bands of the digital wireless audio signal.

At this stage, the system 300 has produced three digital audio signals. It will be understood that in alternate configurations, two, four, five, or more than five digital audio signals can also be used. The system 300 can use cross-correlation to determine if the three digital audio signals represent the same audio content (by comparing a peak value of a cross-correlation against a specified threshold value). If the system 300 determines that the three audio signals do represent the same audio content, then the cross-correlation can determine relative delay values among the three digital audio signals. The system 300 can use the relative delay values downstream to synchronize the three digital audio signals.

The system 300 can include a cross-correlation module 350, 351, 352 for each of the three digital audio signals. Each cross-correlation module 350, 351, 352 can correlate a digital audio signal against one of the other digital audio signals. The output of each cross-correlation module 350, 351, 352 is a set of numerical values that represent a magnitude (or amplitude), as a function of time delay between two of the digital audio signals. Because the two digital audio signals can correspond to the same audio content, the numerical values can show a relatively sharp peak, with the location of the peak representing a relative time delay between the digital audio signals and the peak value representing a strength of the correlation (e.g. a confidence value for the time delay). In some examples, the cross-correlation module 350, 351, 352 can include a comparison with a specified threshold value, such that if the peak value exceeds the threshold, then the system 300 can proceed to use the time delay value downstream. It will be assumed that the peak values exceed the specified threshold, so that the system 300 can continue processing downstream.

Because updating the relative delays can be computationally intensive, the system 300 may optionally not update the delays in real time. Instead, in some examples, the cross-correlation modules 350, 351, 352 can repeatedly update the relative delays among the audio signals at regularly-spaced intervals, such as every ten seconds, every thirty seconds, every minute, or another suitable time interval, or at irregular intervals. Updating the relative delays relatively infrequently (as opposed to in real time) can reduce the required computation of the processor 304, which can extend battery life for a hearing aid.

The system 300 can include multiple cross-correlation modules 350, 351, 352, such as one cross-correlation module for each digital audio signal (e.g., microphone, telecoil, and antenna). Each digital audio signal can be fed to two of the cross-correlation modules 350, 351, 352, so that the cross-correlation modules 350, 351, 352, together, can calculate the relative delay of any digital audio signal relative to any other digital audio signal.

In some examples, for a particular audio signal, the system 300 can determine that the absolute peak value of the cross-correlation is negative. Based on the absolute peak value being negative, the system 300 can determine that the two corresponding audio signals are out of phase with each other. To correct for this phase difference, the system 300 can invert one of the two audio signals to bring the two audio signals into phase with each other. The system 300 can apply this phase correction to all of the audio signals, such that the synchronized audio signals become in phase (specifically, not 180 degrees out of phase) with one another.

A microphone delay 360 can receive relative delay values from two or more of the cross-correlation modules 350, 351, 352, and can delay the digital microphone audio signal by a suitable delay (including zero if the digital microphone audio signal leads the other two digital audio signals) to form a synchronized microphone audio signal.

A telecoil delay 361 can receive relative delay values from two or more of the cross-correlation modules 350, 351, 352, and can delay the digital telecoil audio signal by a suitable delay (including zero if the digital telecoil audio signal leads the other two digital audio signals) to form a synchronized telecoil audio signal.

An antenna delay 362 can receive relative delay values from two or more of the cross-correlation modules 350, 351, 352, and can delay the digital wireless audio signal by a suitable delay (including zero if the digital wireless audio signal leads the other two digital audio signals) to form a synchronized wireless audio signal.

At this stage, the system 300 has now produced multiple synchronized audio signals that are synchronized with one another. The system 300 can now combine one or more of the synchronized audio signals to form an output audio signal, and to increase or maximize a signal-to-noise ratio of the output audio signal.

At amplifiers (or attenuators) 370, 371, and 372, and combiner 380, the system 300 can mix the synchronized audio signals in time-varying proportions, in real time, to increase or maximize a signal-to-noise ratio of the output audio signal 390. Mixing in time-varying proportions, in real time, can include, repeatedly: adjusting the proportions of the synchronized audio signals in the output audio signal and determining a signal-to-noise ratio of the output audio signal, until the signal-to-noise ratio has approached a maximum value with respect to the proportions of the synchronized audio signals in the output audio signal. In some examples, the synchronized audio signals each have a corresponding signal-to-noise ratio, and the output audio signal 390 has a signal-to-noise ratio that is greater than or equal to the signal-to-noise ratios of the synchronized audio signals. In some examples, the system 300 can use dithering to adjust the proportions of the synchronized audio signals in the output audio signal. In some examples, the system 300 can use a hill-climbing algorithm to adjust the proportions of the synchronized audio signals in the output audio signal.

There are numerous ways to determine a signal-to-noise ratio of an audio signal, in real time or near-real time. For example, for speech, a signal-to-noise ratio can scale inversely with a sound level between syllables in the speech, or the sound level between syllables scaled by a sound level during the syllables. Additional examples are provided in the article "Estimation of Signal-to-Noise Ratios in Realistic Sound Scenarios," by Karolina Smeds, Florian Wolters, and Martin Rung, Journal of the American Academy of Audiology, Vol. 26, No. 2, 2015, pp. 183-196, which is incorporated by reference herein in its entirety. Other suitable techniques can also be used to determine the signal-to-noise ratio of the output audio signal.

Figure 4:
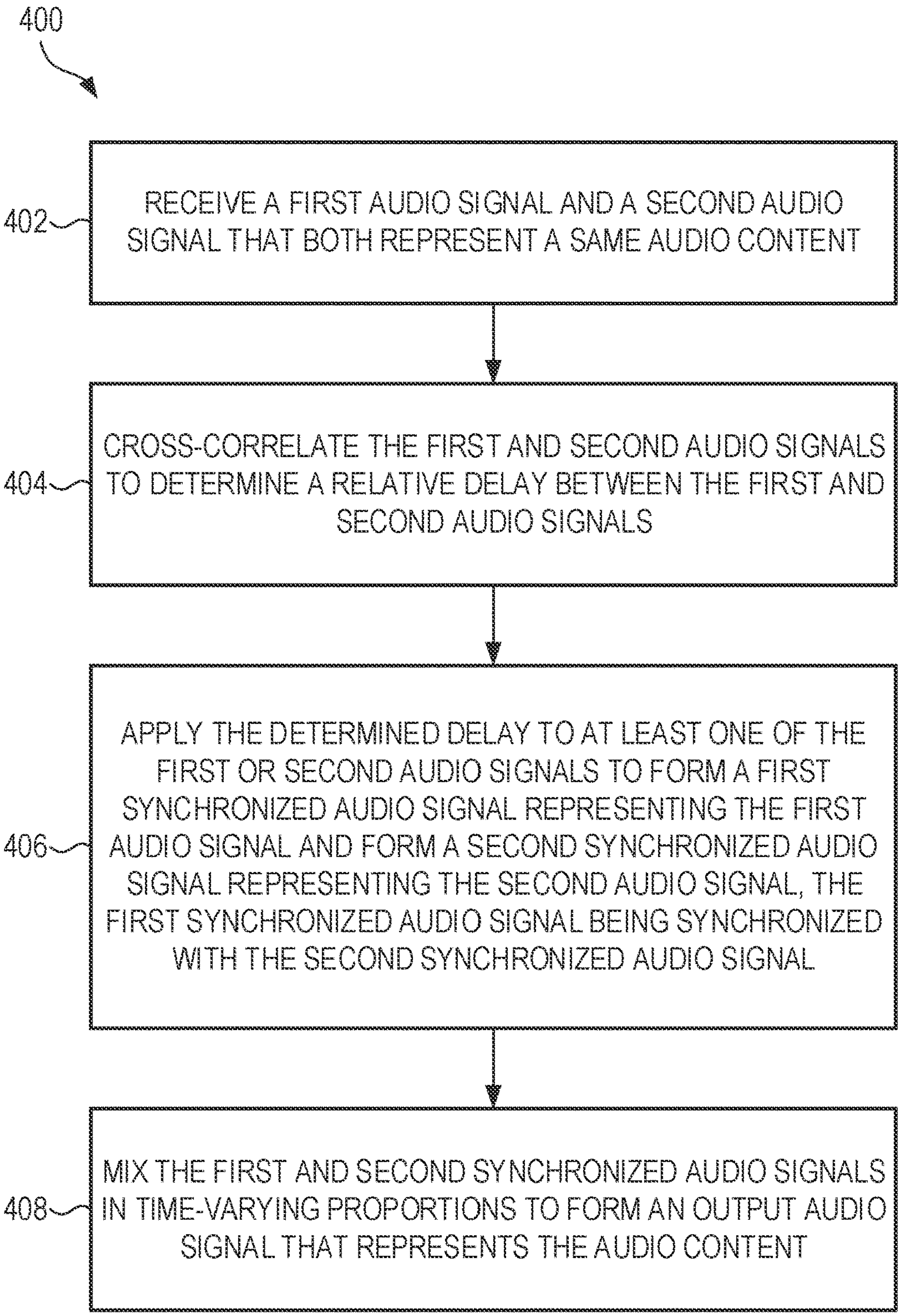
FIG. 4 shows a flow chart of a method for generating an audio signal from multiple inputs, in accordance with some examples.

FIG. 4 shows a flow chart of a method 400 for generating an audio signal from multiple inputs, in accordance with some examples. The method 400 can be executed on the system 100 of FIG. 1, the system 300 of FIG. 3, or on any suitable system. The method 400 is but one example of a method for generating an audio signal from multiple inputs. Oher suitable methods can also be used.

At operation 402, the system can receive a first audio signal and a second audio signal that both represent a same audio content.

At operation 404, the system can cross-correlate the first and second audio signals to determine a relative delay between the first and second audio signals.

At operation 406, the system can apply the determined delay to at least one of the first or second audio signals to form a first synchronized audio signal representing the first audio signal and form a second synchronized audio signal representing the second audio signal, the first synchronized audio signal being synchronized with the second synchronized audio signal.

At operation 408, the system can mix the first and second synchronized audio signals in time-varying proportions to form an output audio signal that represents the audio content.

In some examples, operation 408 can optionally further include mixing the first and second synchronized audio signals in time-varying proportions, in real time, to increase or maximize a signal-to-noise ratio of the output audio signal.

In some examples, operation 408 can optionally further include, repeatedly: adjusting the proportions of the first and second synchronized audio signals in the output audio signal; and determining a signal-to-noise ratio of the output audio signal, until the signal-to-noise ratio has approached a maximum value with respect to the proportions of the first and second synchronized audio signals in the output audio signal.

In some examples, operation 404 can optionally further include: determining that a correlation of the first and second audio signals has an absolute peak value that exceeds a specified correlation value threshold; and determining the relative delay from a location of the absolute peak value.

In some examples, operation 404 can optionally further include: determining that the absolute peak value is negative; determining, based on the absolute peak value being negative, that the first audio signal is out of phase with the second audio signal; and inverting one of the first audio signal or the second audio signal, such that the first and second synchronized audio signals are in phase.

In some examples, method 400 can optionally further include: spectrally decomposing the first audio signal into a specified plurality of adjoining frequency bands to form a plurality of first audio channels; spectrally decomposing the second audio into the specified plurality of adjoining frequency bands to form a plurality of second audio channels; for each frequency band: cross-correlating the first and second audio channels to determine a relative delay between the first and second audio channels; applying the determined delay to at least one of the first or second audio channels to form a first synchronized audio channel representing the first audio channel and form a second synchronized audio channel representing the second audio channel, the first synchronized audio channel being synchronized with the second synchronized audio channel; and mixing the first and second synchronized audio channels in time-varying proportions to form an output audio channel that represents the audio content in the frequency band; and combining the output audio channels to form the output audio signal.

There are additional options that can be used with the systems 100, 300 and the method 400.

In some examples, a leading audio signal can be delayed by a number of samples corresponding to a peak in the cross-correlation curve, but the rate of cross-correlation operations can increase during this adaptation to gain confidence that this delay value is correct or optimal. The chosen time shifts from the past several cross-correlation operations can be averaged together (e.g., through exponential averaging) to determine the best time shift or delay to apply to the leading signal. In general, the time shift can be dynamic to account for unknown processing delay in the loop system.

In some examples, the microphone signal can be designated as a primary signal, such that the phase of the other audio signals can be inverted if needed to match a phase of the microphone signal.

In some examples, if a Boolean trigger event occurs (e.g. a magnetic switch activates or a wireless stream is detected), a hearing aid can respond by switching to the corresponding input (e.g. telecoil for autocoil, microphone for autophone, wireless audio for stream, and so forth). While in this mode, the hearing aid can perform periodic cross-correlation operations with other appropriate inputs and can be used to increase or maximize a signal-to-noise ratio of the output audio signal.

In some examples, the system can change which input audio signals are monitored, depending on which input audio signals is the primary input. For example, if the autocoil is the primary input, the system can monitor the microphone signal. If the autophone is the primary input, the system can monitor the telecoil signal. If the stream is the primary input, the system can monitor the microphone signal and the telecoil signal. Other combinations are also possible. In some examples, the appropriate inputs can vary situationally. For example, if the hearing aid can tell the difference between a public/broadcast stream (e.g., an airport announcement) and a private/addressed stream (e.g., a phone call), the system can vary which input audio signals are monitored as needed.

In some examples, the system can force the lowest channel in directional mode to stay omnidirectional. This can reduce hearing aid self-noise for a greater signal-to-noise improvement than attempting to stay directional.

In some examples, the system can apply heuristics to make some caveats to its algorithm. For example, when the acoustic signal is correlated to a low-fidelity stream, the system can weight the highest frequencies 100% to the microphone signal, even though it may not correlate to the stream at those frequencies because the low-fidelity stream may not extend to frequencies that high. There can be other circumstances in which the system selects a wider bandwidth over an improved narrowband signal-to-noise ratio.

In some examples, the system can apply heuristics regarding a maximum value of delay. If there is a streamed signal present, the system can automatically switch to the streamed input. If the cross-correlation determines that the acoustic signal is highly correlated to the stream, and has a much shorter delay, the system can begin to mix the acoustic signal and the stream to increase or maximize the signal-to-noise ratio of the output. In some examples, if the mixing weights are close to 50%, or even skew toward favoring the microphone signal, the system can decide to no longer delay the microphone signal for mixing, can decide to ignore the stream, and can use only the microphone signal to reduce the total audio delay.

In some examples, the system can apply additional heuristics when band-by-band signal-to-noise ratio optimization may not make sense. For instance, if we know that a particular input signal has a limited bandwidth (e.g., due to streaming codec limitations), the high-frequency signal may not be correlated. For these situations, if low-frequency signals turn out to be correlated, the system can weight the secondary correlated signal 100% in the high bands to restore high frequency content.

In some examples, the system can monitor a signal level (e.g., a root-mean-square signal level) in band to detect when an input has a limited bandwidth. If several of the highest-frequency bands have relatively low levels, such as a below a specified threshold for a specified duration, the system can conclude that the signal source does not have any content at those higher frequencies. This can free the system from cataloguing the bandwidths of the various types of signal and can allow the system to work with unknown sources that have unknown bandwidths.

In some examples, the system can limit use of an audio signal at particular frequencies or frequency bands. For example, for a telephone call, a listener would not expect to hear any content at frequencies higher than about 3 kHz or 4 kHz. As a result, the system can block content for frequencies above about 3 kHz or 4 kHz, for a phone input, including a stream or a telecoil. This can help avoid having different-sounding content in adjacent frequency bands. Similarly, a vibration sensor may only have content below a threshold frequency, such as about 1 kHz. The system can optionally block content about 1 kHz for the vibration sensor signal.

In some examples, the system can allow a listener to access settings of this signal processing, such as through a mobile application that runs on a user device, such as a smart phone. In this manner, the listener can manually adjust a mix, and/or adjust preferences for how audio signals are mixed, including parameters such as a speed and priority. In some examples, the mobile application can notify the listener that a better-sounding input is available. In some examples, an audible alert can notify the listener that a better-sounding input is available.

In some examples, the system can include leveling logic to maintain suitable signal levels in each band.

In some examples, the system can additionally include features that allow audio to be presented to a listener in both ears, rather than a single ear. Such features can help ensure that audio content can be balanced between a listener's ears.

Although the inventive concept has been described in detail for the purpose of illustration based on various examples, it is to be understood that such detail is solely for that purpose and that the inventive concept is not limited to the disclosed examples, but, on the contrary, is intended to cover modifications and equivalent arrangements that are within the spirit and scope of the appended claims. For example, it is to be understood that the present disclosure contemplates that, to the extent possible, one or more features of any example can be combined with one or more features of any other example.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

EXAMPLES

To further illustrate the device, related system, and/or and related method discussed herein, a non-limiting list of examples is provided below. Each of the following non-limiting examples can stand on its own, or can be combined in any permutation or combination with any one or more of the other examples.

In Example 1, a system for generating an audio signal from multiple inputs system can include: at least one processor; and memory coupled to the at least one processor, the memory configured to store instructions that, when executed by the at least one processor, cause the at least one processor to execute operations, the operations comprising: receiving a first audio signal and a second audio signal that both represent a same audio content; cross-correlating the first and second audio signals to determine a relative delay between the first and second audio signals; applying the determined delay to at least one of the first or second audio signals to form a first synchronized audio signal representing the first audio signal and form a second synchronized audio signal representing the second audio signal, the first synchronized audio signal being synchronized with the second synchronized audio signal; and mixing the first and second synchronized audio signals in time-varying proportions to form an output audio signal that represents the audio content.

In Example 2, the system of Example 1 can optionally be configured such that the operations further comprise: mixing the first and second synchronized audio signals in time-varying proportions, in real time, to increase or maximize a signal-to-noise ratio of the output audio signal.

In Example 3, the system of any one of Examples 1-2 can optionally be configured such that mixing the first and second synchronized audio signals in time-varying proportions, in real time, to increase or maximize the signal-to-noise ratio of the output audio signal comprises, repeatedly: adjusting the proportions of the first and second synchronized audio signals in the output audio signal; and determining a signal-to-noise ratio of the output audio signal, until the signal-to-noise ratio has approached a maximum value with respect to the proportions of the first and second synchronized audio signals in the output audio signal.

In Example 4, the system of any one of Examples 1-3 can optionally be configured such that the first and second audio signals each have a corresponding signal-to-noise ratio; and the output audio signal has a signal-to-noise ratio that is greater than or equal to the signal-to-noise ratios of the first and second audio signals.

In Example 5, the system of any one of Examples 1-4 can optionally be configured such that the operations further comprise: cross-correlating the first and second audio signals, repeatedly, to update the relative delay between the first and second audio signals.

In Example 6, the system of any one of Examples 1-5 can optionally be configured such that cross-correlating the first and second audio signals to determine the relative delay between the first and second audio signals comprises: determining that a correlation of the first and second audio signals has an absolute peak value that exceeds a specified correlation value threshold; and determining the relative delay from a location of the absolute peak value.

In Example 7, the system of any one of Examples 1-6 can optionally be configured such that the operations further comprise: determining that the absolute peak value is negative; determining, based on the absolute peak value being negative, that the first audio signal is out of phase with the second audio signal; and inverting one of the first audio signal or the second audio signal, such that the first and second synchronized audio signals are in phase.

In Example 8, the system of any one of Examples 1-7 can optionally be configured such that the operations further comprise: spectrally decomposing the first audio signal into a specified plurality of adjoining frequency bands to form a plurality of first audio channels; spectrally decomposing the second audio into the specified plurality of adjoining frequency bands to form a plurality of second audio channels; for each frequency band: cross-correlating the first and second audio channels to determine a relative delay between the first and second audio channels; applying the determined delay to at least one of the first or second audio channels to form a first synchronized audio channel representing the first audio channel and form a second synchronized audio channel representing the second audio channel, the first synchronized audio channel being synchronized with the second synchronized audio channel; and mixing the first and second synchronized audio channels in time-varying proportions to form an output audio channel that represents the audio content in the frequency band; and combining the output audio channels to form the output audio signal.

In Example 9, the system of any one of Examples 1-8 can optionally be configured such that the operations further comprise, for each frequency band: adjusting a volume level of each output audio channel to a specified volume level.

In Example 10, the system of any one of Examples 1-9 can optionally further include a microphone coupled to the at least one processor and configured to convert sound waves proximate the microphone to a microphone audio signal, the microphone audio signal being the first audio signal.

In Example 11, the system of any one of Examples 1-10 can optionally further include a telecoil coupled to the at least one processor and configured to convert a modulated electromagnetic field proximate the telecoil to a telecoil audio signal, the telecoil audio signal being the second audio signal.

In Example 12, the system of any one of Examples 1-11 can optionally further include an antenna coupled to the at least one processor and configured to convert a wireless signal proximate the antenna to an wireless audio signal, the wireless audio signal being the second audio signal.

In Example 13, a method for generating an audio signal from multiple inputs can include: receiving a first audio signal and a second audio signal that both represent a same audio content; cross-correlating the first and second audio signals to determine a relative delay between the first and second audio signals; applying the determined delay to at least one of the first or second audio signals to form a first synchronized audio signal representing the first audio signal and form a second synchronized audio signal representing the second audio signal, the first synchronized audio signal being synchronized with the second synchronized audio signal; and mixing the first and second synchronized audio signals in time-varying proportions to form an output audio signal that represents the audio content.

In Example 14, the method of Example 13 can optionally further include: mixing the first and second synchronized audio signals in time-varying proportions, in real time, to increase or maximize a signal-to-noise ratio of the output audio signal.

In Example 15, the method of any one of Examples 13-14 can optionally be configured such that mixing the first and second synchronized audio signals in time-varying proportions, in real time, to increase or maximize the signal-to-noise ratio of the output audio signal comprises, repeatedly: adjusting the proportions of the first and second synchronized audio signals in the output audio signal; and determining a signal-to-noise ratio of the output audio signal, until the signal-to-noise ratio has approached a maximum value with respect to the proportions of the first and second synchronized audio signals in the output audio signal.

In Example 16, the method of any one of Examples 13-15 can optionally further include: cross-correlating the first and second audio signals, repeatedly, to update the relative delay between the first and second audio signals.

In Example 17, the method of any one of Examples 13-16 can optionally be configured such that cross-correlating the first and second audio signals to determine the relative delay between the first and second audio signals comprises: determining that a correlation of the first and second audio signals has an absolute peak value that exceeds a specified correlation value threshold; and determining the relative delay from a location of the absolute peak value.

In Example 18, the method of any one of Examples 13-17 can optionally further include: determining that the absolute peak value is negative; determining, based on the absolute peak value being negative, that the first audio signal is out of phase with the second audio signal; and inverting one of the first audio signal or the second audio signal, such that the first and second synchronized audio signals are in phase.

In Example 19, the method of any one of Examples 13-18 can optionally further include: spectrally decomposing the first audio signal into a specified plurality of adjoining frequency bands to form a plurality of first audio channels; spectrally decomposing the second audio into the specified plurality of adjoining frequency bands to form a plurality of second audio channels; for each frequency band: cross-correlating the first and second audio channels to determine a relative delay between the first and second audio channels; applying the determined delay to at least one of the first or second audio channels to form a first synchronized audio channel representing the first audio channel and form a second synchronized audio channel representing the second audio channel, the first synchronized audio channel being synchronized with the second synchronized audio channel; and mixing the first and second synchronized audio channels in time-varying proportions to form an output audio channel that represents the audio content in the frequency band; and combining the output audio channels to form the output audio signal.

In Example 20, an ear-wearable device can include: a housing; at least one processor disposed in the housing; a microphone coupled to the at least one processor and configured to convert sound waves proximate the housing to a microphone audio signal that represents an audio content; a telecoil coupled to the at least one processor and configured to convert a modulated electromagnetic field proximate the housing to a telecoil audio signal that represents the audio content; an antenna coupled to the at least one processor and configured to convert a wireless signal proximate the housing to a wireless audio signal that represents the audio content; and memory coupled to the at least one processor, the memory configured to store instructions that, when executed by the at least one processor, cause the at least one processor to execute operations, the operations comprising: receiving the microphone audio signal, the telecoil audio signal, and the wireless audio signal; cross-correlating the microphone audio signal, the telecoil audio signal, and the wireless audio signal to determine relative delays among the microphone audio signal, the telecoil audio signal, and the wireless audio signal; applying the determined delays to at least some of the microphone audio signal, the telecoil audio signal, or the wireless audio signal to form a synchronized microphone audio signal representing the microphone audio signal, form a synchronized telecoil audio signal representing the telecoil audio signal, and form a synchronized wireless audio signal representing the wireless audio signal, the synchronized microphone audio signal, the synchronized telecoil audio signal, and the synchronized wireless audio signal being synchronized to one another; and mixing at least two of the synchronized microphone audio signal, the synchronized telecoil audio signal, or the synchronized wireless audio signal in time-varying proportions to form an output audio signal that represents the audio content; and a speaker disposed in the housing and configured to produce audio corresponding to the output audio signal.

What is claimed is:

1. A system for generating an audio signal from multiple inputs, comprising:
   at least one processor; and
   memory coupled to the at least one processor, the memory configured to store instructions that, when executed by the at least one processor, cause the at least one processor to execute operations, the operations comprising:
   receiving a first audio signal and a second audio signal that both represent a same audio content;
   cross-correlating the first and second audio signals to determine a relative delay between the first and second audio signals, wherein cross-correlating comprises determining that a correlation of the first and second audio signals has an absolute peak value that exceeds a specified correlation value threshold and determining the relative delay from a location of the absolute peak value;
   applying the determined delay to at least one of the first or second audio signals to form a first synchronized audio signal representing the first audio signal and form a second synchronized audio signal representing the second audio signal, the first synchronized audio signal being synchronized with the second synchronized audio signal; and
   mixing the first and second synchronized audio signals in time-varying proportions to form an output audio signal that represents the audio content.

2. The system of claim 1, wherein the operations further comprise:
   mixing the first and second synchronized audio signals in time-varying proportions, in real time, to increase or maximize a signal-to-noise ratio of the output audio signal.

3. The system of claim 2, wherein mixing the first and second synchronized audio signals in time-varying proportions, in real time, to increase or maximize the signal-to-noise ratio of the output audio signal comprises, repeatedly:
   adjusting the proportions of the first and second synchronized audio signals in the output audio signal; and
   determining a signal-to-noise ratio of the output audio signal,
   until the signal-to-noise ratio has approached a maximum value with respect to the proportions of the first and second synchronized audio signals in the output audio signal.

4. The system of claim 1, wherein:
   the first and second audio signals each have a corresponding signal-to-noise ratio; and
   the output audio signal has a signal-to-noise ratio that is greater than or equal to the signal-to-noise ratios of the first and second audio signals.

5. The system of claim 1, wherein the operations further comprise:
   cross-correlating the first and second audio signals, repeatedly, to update the relative delay between the first and second audio signals.

6. The system of claim 1, wherein the operations further comprise:
   determining that the absolute peak value is negative;
   determining, based on the absolute peak value being negative, that the first audio signal is out of phase with the second audio signal; and
   inverting one of the first audio signal or the second audio signal, such that the first and second synchronized audio signals are in phase.

7. The system of claim 1, wherein the operations further comprise:
   spectrally decomposing the first audio signal into a specified plurality of adjoining frequency bands to form a plurality of first audio channels;
   spectrally decomposing the second audio into the specified plurality of adjoining frequency bands to form a plurality of second audio channels;
   for each frequency band:
   cross-correlating the first and second audio channels to determine a relative delay between the first and second audio channels;
   applying the determined delay to at least one of the first or second audio channels to form a first synchronized audio channel representing the first audio channel and form a second synchronized audio channel representing the second audio channel, the first synchronized audio channel being synchronized with the second synchronized audio channel; and mixing the first and second synchronized audio channels in time-varying proportions to form an output audio channel that represents the audio content in the frequency band; and combining the output audio channels to form the output audio signal.

8. The system of claim 7, wherein the operations further comprise, for each frequency band: adjusting a volume level of each output audio channel to a specified volume level.

9. The system of claim 1, further comprising a microphone coupled to the at least one processor and configured to convert sound waves proximate the microphone to a microphone audio signal, the microphone audio signal being the first audio signal.

10. The system of claim 9, further comprising a telecoil coupled to the at least one processor and configured to convert a modulated electromagnetic field proximate the telecoil to a telecoil audio signal, the telecoil audio signal being the second audio signal.

11. The system of claim 9, further comprising a radio and an antenna coupled to the at least one processor and configured to convert a wireless signal proximate the antenna to a wireless audio signal, the wireless audio signal being the second audio signal.

12. A method for generating an audio signal from multiple inputs, comprising:

receiving a first audio signal and a second audio signal that both represent a same audio content;

cross-correlating the first and second audio signals to determine a relative delay between the first and second audio signals, wherein cross-correlating comprises determining that a correlation of the first and second audio signals has an absolute peak value that exceeds a specified correlation value threshold and determining the relative delay from a location of the absolute peak value;

applying the determined delay to at least one of the first or second audio signals to form a first synchronized audio signal representing the first audio signal and form a second synchronized audio signal representing the second audio signal, the first synchronized audio signal being synchronized with the second synchronized audio signal; and mixing the first and second synchronized audio signals in time-varying proportions to form an output audio signal that represents the audio content.

13. The method of claim 12, further comprising:

mixing the first and second synchronized audio signals in time-varying proportions, in real time, to increase or maximize a signal-to-noise ratio of the output audio signal.

14. The method of claim 13, wherein mixing the first and second synchronized audio signals in time-varying proportions, in real time, to increase or maximize the signal-to-noise ratio of the output audio signal comprises, repeatedly:

adjusting the proportions of the first and second synchronized audio signals in the output audio signal; and determining a signal-to-noise ratio of the output audio signal, until the signal-to-noise ratio has approached a maximum value with respect to the proportions of the first and second synchronized audio signals in the output audio signal.

15. The method of claim 12, further comprising:

cross-correlating the first and second audio signals, repeatedly, to update the relative delay between the first and second audio signals.

16. The method of claim 12, further comprising:

determining that the absolute peak value is negative;

determining, based on the absolute peak value being negative, that the first audio signal is out of phase with the second audio signal; and inverting one of the first audio signal or the second audio signal, such that the first and second synchronized audio signals are in phase.

17. The method of claim 12, further comprising:

spectrally decomposing the first audio signal into a specified plurality of adjoining frequency bands to form a plurality of first audio channels;

spectrally decomposing the second audio into the specified plurality of adjoining frequency bands to form a plurality of second audio channels;

for each frequency band:

cross-correlating the first and second audio channels to determine a relative delay between the first and second audio channels;

applying the determined delay to at least one of the first or second audio channels to form a first synchronized audio channel representing the first audio channel and form a second synchronized audio channel representing the second audio channel, the first synchronized audio channel being synchronized with the second synchronized audio channel; and mixing the first and second synchronized audio channels in time-varying proportions to form an output audio channel that represents the audio content in the frequency band; and combining the output audio channels to form the output audio signal.

18. An ear-wearable device, comprising:

a housing;

at least one processor disposed in the housing;

a microphone coupled to the at least one processor and configured to convert sound waves proximate the housing to a microphone audio signal that represents an audio content;

a telecoil coupled to the at least one processor and configured to convert a modulated electromagnetic field proximate the housing to a telecoil audio signal that represents the audio content;

a radio and an antenna coupled to the at least one processor and configured to convert a wireless signal proximate the housing to a wireless audio signal that represents the audio content; and memory coupled to the at least one processor, the memory configured to store instructions that, when executed by the at least one processor, cause the at least one processor to execute operations, the operations comprising:

receiving the microphone audio signal, the telecoil audio signal, and the wireless audio signal;

cross-correlating the microphone audio signal, the telecoil audio signal, and the wireless audio signal to determine relative delays among the microphone audio signal, the telecoil audio signal, and the wireless audio signal;

applying the determined delays to at least some of the microphone audio signal, the telecoil audio signal, or the wireless audio signal to form a synchronized microphone audio signal representing the microphone audio signal, form a synchronized telecoil audio signal representing the telecoil audio signal, and form a synchronized wireless audio signal representing the wireless audio signal, the synchronized microphone audio signal, the synchronized telecoil audio signal, and the synchronized wireless audio signal being synchronized to one another; and mixing at least two of the synchronized microphone audio signal, the synchronized telecoil audio signal, or the synchronized wireless audio signal in time-varying proportions to form an output audio signal that represents the audio content; and a speaker disposed in the housing and configured to produce audio corresponding to the output audio signal.

* * * * *